Sept. 29, 1964   W. HILDEBRANDT   3,151,322
EVALUATING SYSTEM FOR PROCESSING RADAR SIGNALS
Filed Oct. 19, 1961   7 Sheets-Sheet 1

INVENTOR
Werner Hildebrandt

BY George H. Spencer
ATTORNEY

Sept. 29, 1964  W. HILDEBRANDT  3,151,322
EVALUATING SYSTEM FOR PROCESSING RADAR SIGNALS
Filed Oct. 19, 1961  7 Sheets-Sheet 2

INVENTOR
Werner Hildebrandt

BY George H Spencer
ATTORNEY

Sept. 29, 1964   W. HILDEBRANDT   3,151,322
EVALUATING SYSTEM FOR PROCESSING RADAR SIGNALS
Filed Oct. 19, 1961   7 Sheets-Sheet 3

*INVENTOR*
Werner Hildebrandt

BY *George H. Spencer*
ATTORNEY

United States Patent Office 3,151,322
Patented Sept. 29, 1964

3,151,322
EVALUATING SYSTEM FOR PROCESSING RADAR SIGNALS
Werner Hildebrandt, Konstanz (Bodensee), Germany, assignor to Telefunken Patentverwertungs-G.m.b.H., Ulm (Danube), Germany
Filed Oct. 19, 1961, Ser. No. 146,374
23 Claims. (Cl. 343—5)

The present invention relates to radar, especially to a system for evaluating, i.e., analyzing and interpreting, radar signals and to make use of the results obtained therefrom.

More particularly, the present invention relates to a evaluating system for determining the location, as well as changes of location, of airborne or other movable objects, hereinafter referred to as targets, in which the signals which are derived from the system are applied to an optical viewer, such as a plan-position indicator (PPI) display, or to other means for processing the intelligence. Particularly in the latter case, the signals are digitalized by means of a so-called digital detector which is connected to the antenna output and itself has an output which gives the echos in terms of Cartesian or polar coordinates, the purpose of such a digital detector being to improve the information or intelligence evaluation, to allow the band width to be compressed for transmission purposes, and to facilitate the application of the intelligence to digitally operating information processing systems. In such an arrangement, it is known to connect a buffer capacitor to the digital connector, which capacitor receives the incoming echo signals that arrive at an irregular rate and, under certain circumstances, in very rapid succession, so that the signals obtained, for instance during one antenna revolution, can be extracted from the capacitor at an even rate and hence at a reduced frequency, the purpose of this likewise being to reduce the band width, as well as to obtain processing intervals of constant duration.

The object of all such systems is to detect as much relevant and as little irrelevant information as possible, the latter serving only to encumber the system unnecessarily and to distort such useful information as is detected. If the sensitivity of the system is increased, i.e., if the response threshold is reduced, it will occur all the more frequently that noise peaks will be interpreted incorrectly, as being echo signals. It is very possible, then, that an excess of such spurious echos will uncontrollably overwhelm the system, particularly the afore-mentioned buffer capacitor. Yet another factor that must be taken into consideration is that weather and atmospheric conditions will contribute to the generation of spurious echos.

One known system which carries out a selection among the echos is the so-called moving-target indication (MTI), which discriminates in favor of signals returned by moving targets and suppresses signals reflected by stationary objects. Such a system is based on the use of the Doppler effect, according to which the carrier frequency of the echo reflected by a target moving either towards or away from the radar set shifts by an amount proportional to the product of radial velocity and transmitted frequency. Such a system, however, is able to suppress only those signals which are actually reflected by stationary targets, but not spurious echos resulting from noise.

It is, therefore, an object of the present invention to provide a system which eliminates irrelevant signals to a large extent, and a preferred embodiment of such a system involves the processing of signals which are put out by a digital detector and are to be applied to an evaluator, for example a buffer capacitor. According to the present invention, the evaluating system incorporates a filter which, under the influence of criteria that are predetermined by changes in the target co-ordinates, carries out a selection among the subsequent signals. The target co-ordinates will, of course, have to constitute data giving a definitive position of the target relative to the radar set, and not just one co-ordinate as, for example, the distance of the target from the set.

In particular, the evaluating system incorporates means in which previously determined target positions are used to determine subsequently expected target positions, which are then used as a criterion for controlling the filter. Thus, the traffic conditions as determined, for example, during the course of one antenna revolution can be made the basis for suppressing irrelevant signals throughout the next antenna revolution, as a result of which this suppression can still be made effective even though the system is adjusted for high sensitivity. Care must be taken, however, that from the many available signals also those be provisionally included which, although they do not give an immediate indication of traffic conditions, are nevertheless potentially relevant. According to the present invention, this is accomplished by letting the filter selectivity be such that signals are included which cannot be correlated to previously determined target positions but which are above a given threshold criterion. This threshold criterion will in particular be such that stronger echos which exceed a given threshold intensity (which is higher than the normal threshold value to which the system is adjusted) are regarded as having been reflected by presumably relevant targets. This threshold is suitably made dependent on distance, inasmuch as true echos become weaker with distance. It is possible, however, that the first of such stronger echos as well as those which appear as subsequent ones, are actually spurious echos, and in order to avoid this, the arrangement is such that selected signals, while passed at first, are suppressed at later selections of several of the expected echos are found to be missing.

In a preferred embodiment of the present invention, the expected target positions, as calculated on the basis of previously determined, digitalized target positions, are determined by means of an electronic computer. It is possible, however, to obtain the criteria by means of a reading beam which determines the target co-ordinate changes on an image screen. The computer can calculate, for example on the basis of target positions, one or several points of an expected region within which the target will be found during a subsequent sweep. This region will, of course, be a function of the mobility chararcteristics of the target, such as speed and maneuverability, and the filter can then make a selection according to vicinity characteristics (Does the echo lie in the vicinity of the calculated point or not?). In this case, all that is necessary is that the co-ordinates of, say, one point be transmitted back to the receiver component, which may be located at a distance from the computer component. Alternatively, the computer can calculate a representation of the entire region of expectation or anticipation, i.e., the entire region within which the target may be found during a subsequent scanning, hereinafter referred to as the regex, an acronym derived from REGion of EXpectation. This regex then becomes the selection criterion in the filter which then tests as to whether or not a subsequent echo is reflected by a target located within the regex. Newly appearing target echos will have to be treated differently from those reflected by targets of known course; for the former, the regex is a complete annular area whereas for the latter, the regex is a segment of an annular area, as will be described below.

Additional objects and advantages of the present invention will become apparent upon consideration of the following description when taken in conjunction with the accompanying drawings in which.

Figure 10:
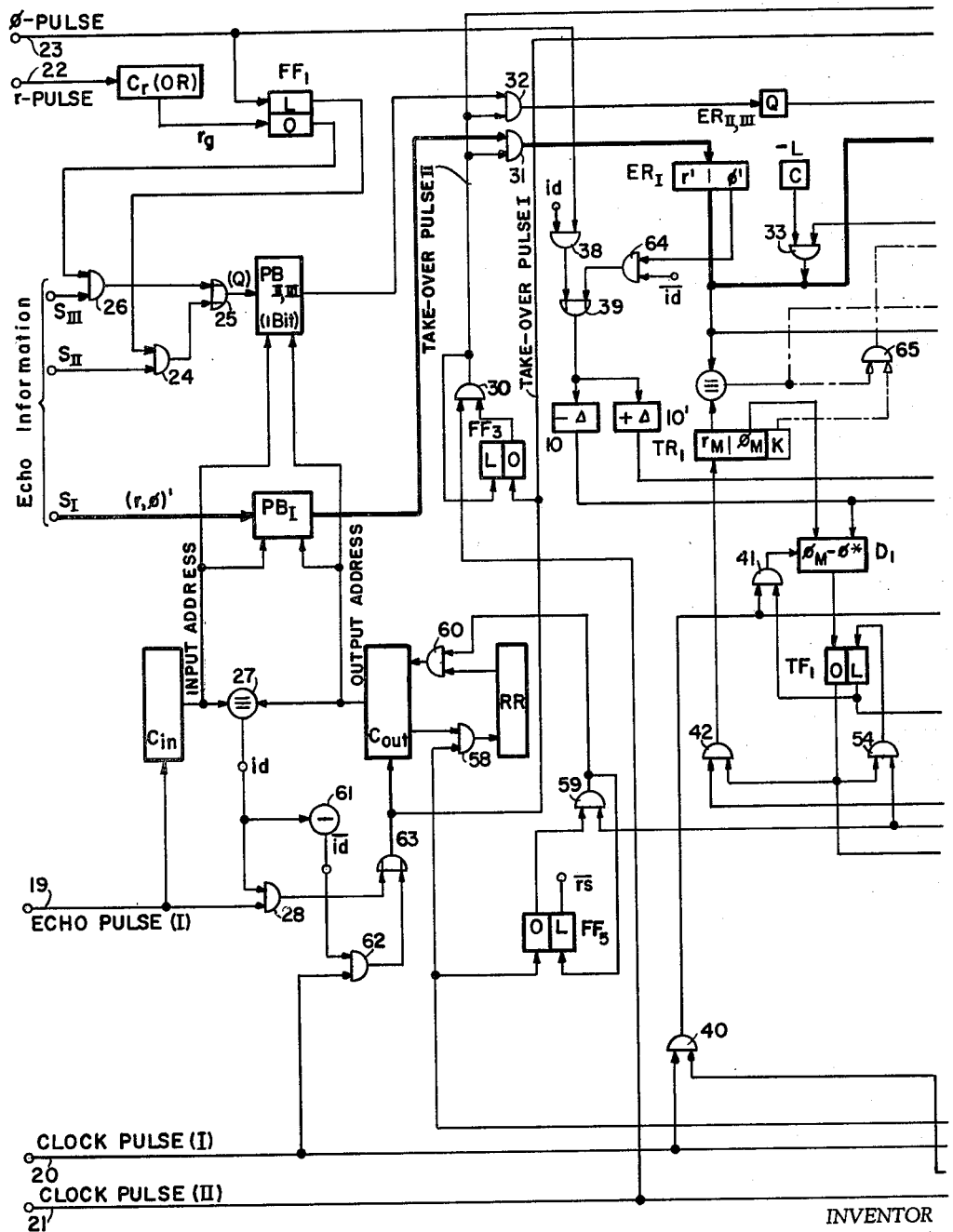
Figure 10A:
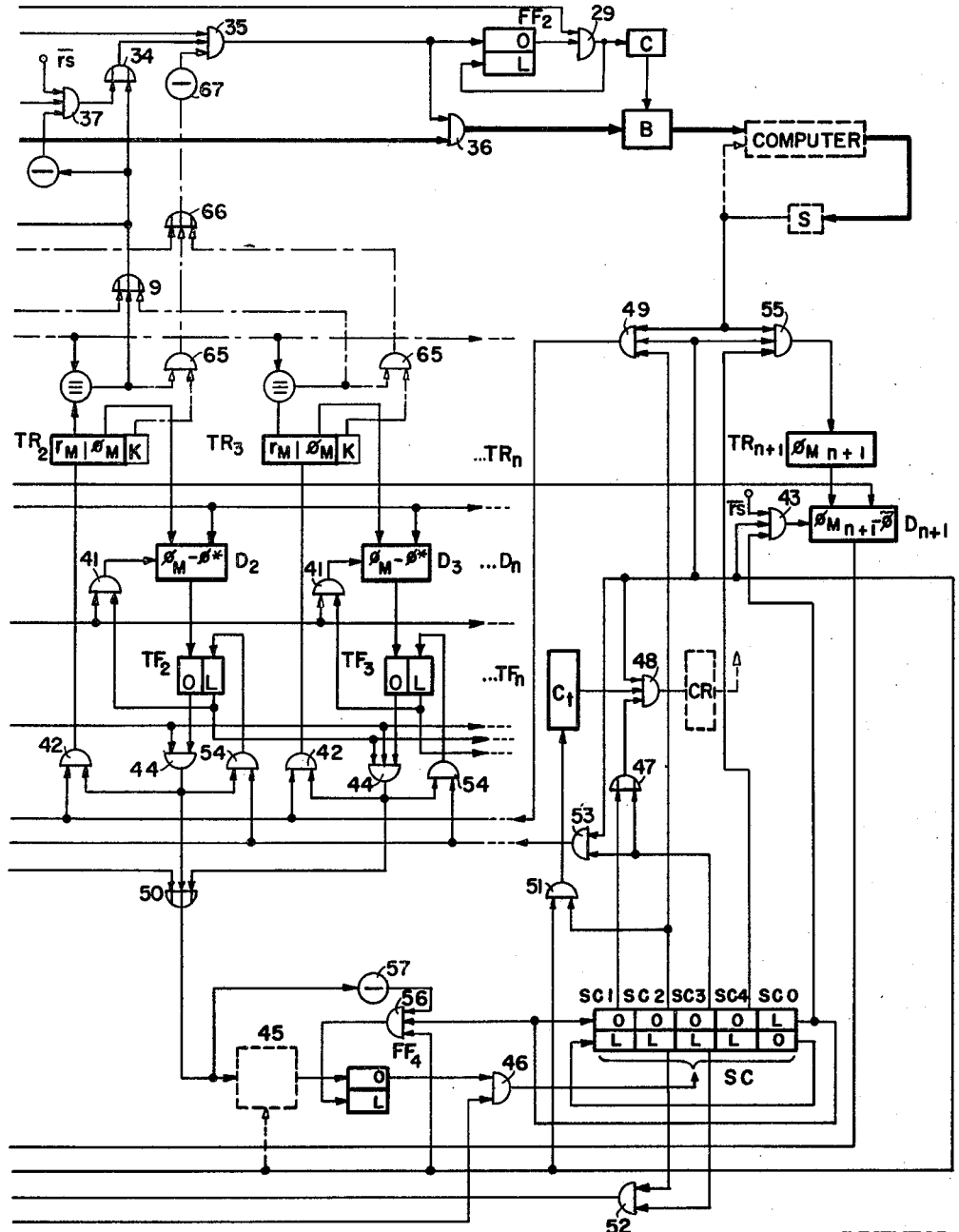

FIGURES 10 and 10a together constitute a comprehensive block diagram of a complete system according to the present invention.

Figure 3:
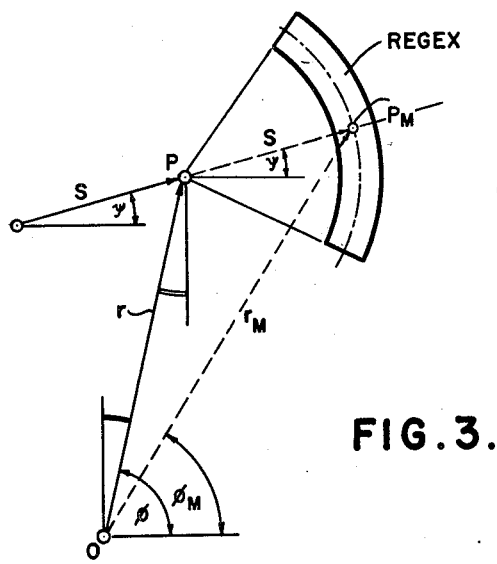
FIGURE 3 is a plot similar to FIGURE 1, showing additional explanatory material.
Figure 11:
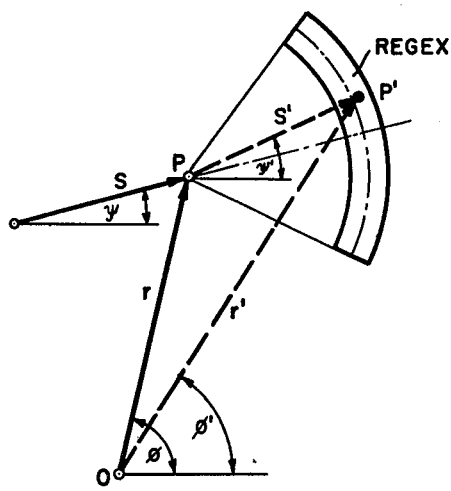

FIGURE 11 is still another geometric representation, similar to FIGURE 3, showing still further explanatory material.

Before proceeding with a description of the invention in conjunction with the drawings, the following explanatory matter should be considered.

The interpulse period or pulse time, i.e., the time between two consecutive transmitted pulses (for example, 1 millisecond), of a radar system determines the range (150 kilometers) and the pulse width (for example, 1 microsecond) determines the radial dissolution (150 meters), from which results the number of discrete distances (1,000). The rotational speed of the antenna (for example, 1 revolution every 10 seconds) determines the number of discrete directions (10,000 transmitted pulses per revolution), and, together with the focussing or directivity (of the order of 1°), the average number of hits (in the sense of reflections) per target (about 20 hits). The azimuthal resolution is approximately 1½ times that of the focussing.

A reflected radar pulse is recognized as such if its amplitude exceeds a certain threshold value. For increasing the signal-to-noise ratio, a plurality of so-called radar lines (received information between two transmitted pulses) are superimposed, with the number of superimpositions being made equal to the average number of reflections (the improvement factor with $n$ superimpositions $= \sqrt{n}$). This is possible because the target, during the time interval (20 milliseconds) throughout which it is struck with radar signals, remains practically stationary. Normally, a digital detector delivers to the data processing unit, for each target lying in the range upon each antenna revolution, an echo in digital form (a true echo). The sum total of the echos, however, includes a fault component. The digital value may be in the nature of polar co-ordinates $(r, \phi)$, namely, distance and bearing, rectangular co-ordinates $(x = \lambda \cos \phi, y = \lambda \sin \phi)$, or a number N resulting from a count of all $10^7$ cells (1,000 distances for each of the 10,000 bearings) since all $10^7$ cells are scanned one after the other, N thus being a composite number obtained from the values $r$ and $\phi$.

Figure 1:
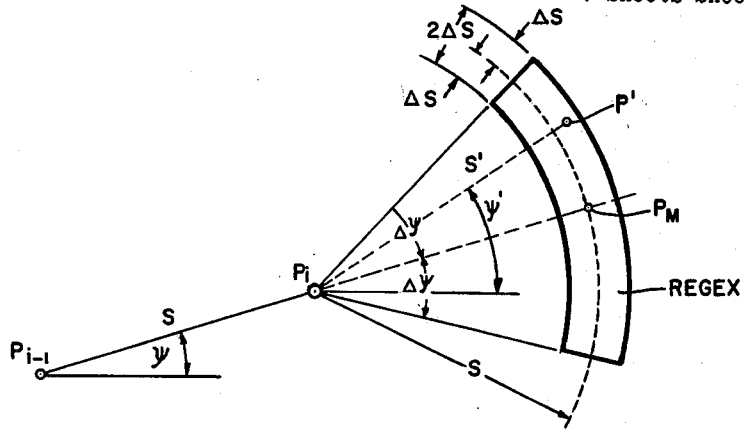
FIGURE 1 is a geometrical representation by means of which the underlying principles of the present invention are explained.

Referring now to FIGURE 1, the same shows how the regex of, for example, an aircraft may be determined. In FIGURE 1, the position of the craft at a given instant $i$ is shown at $P_i$, whereas the position of the craft at a previous instant $i-1$ is shown at $P_{i-1}$. From these positions, the speed and heading of the craft can be calculated as being $s$ and $\psi$, respectively. In practice, the maneuverability of a target, especially an aircraft, is limited; for example, within a time interval of 10 seconds, which is the duration of 1 antenna revolution, the maximum change of speed $\Delta s$ may be taken as $\pm 10\%$, and the maximum change of heading as $\pm 30°$. If the craft undergoes no change of speed or heading between the instant $i$ and the subsequent instant M, it will occupy the position $P_M$. If, however, the target has assumed a new speed $s'$ and a new heading $\psi'$, it will occupy the position $P'$ located within the regex, the regex being an arcuate area whose center is the point $P_M$, whose inner arcuate limit is defined by an arc having its center at $P_i$ and a radius of $s - \Delta s$, whose outer arcuate limit is defined by an arc having its center likewise at $P_i$ but a radius of $s + \Delta s$, and whose ends are limited by radii which form with a continuation of the line drawn from $P_{i-1}$ to $P_i$ angles of $\psi - \Delta \psi$ and $\psi + \Delta \psi$, respectively.

Figure 2:
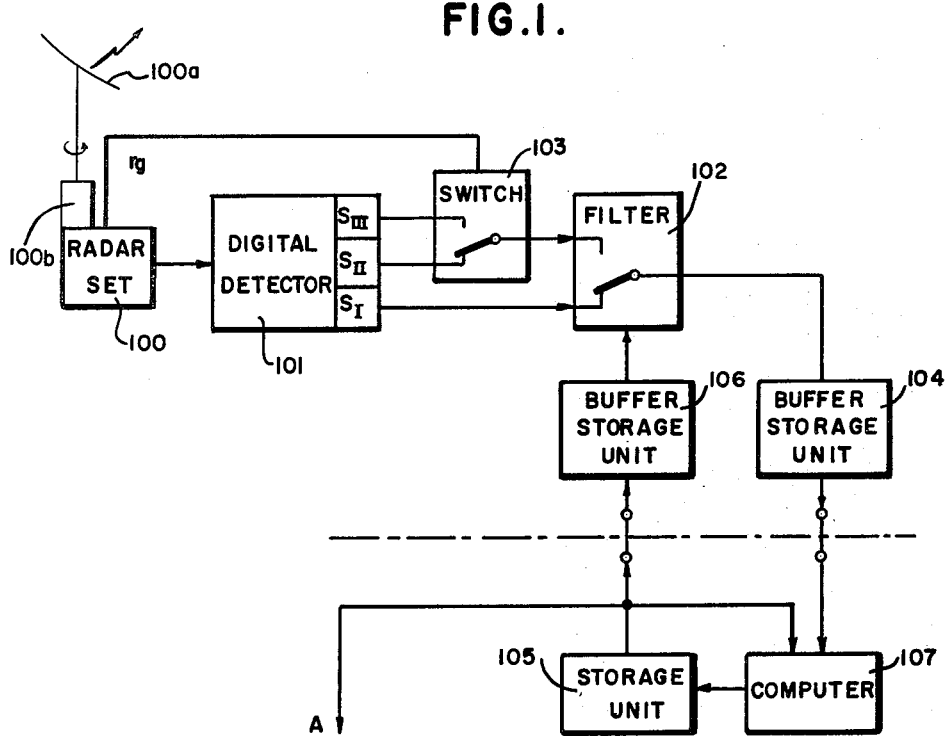
FIGURE 2 is a block diagram of a system according to the instant invention.

FIGURE 2 is a schematic block diagram of a system according to the present invention and capable of carrying out the above evaluation. The system comprises a radar set 100 incorporating an antenna 100a provided with moving means 100b, the radiation pattern being shown symbolically by the flash. The system further comprises a digital detector 101 which, for each echo signal which exceeds a threshold value $S_I$, puts out a coordinate pair $(r, \phi)$. All of these thus digitalized target signals reach the input of a filter 102. The echo signal will be reflected from a target located at a point which is either on one side or the other of a circular line of demarcation spaced from the radar set a range or distance equal to $r_g$; all points which are spaced from the radar set a distance or range $r$ that is equal to or smaller than $r_g$ will be considered as lying in a "near" region while all points which are spaced from the radar set a distance or range $r$ that is greater than $r_g$ and less than the maximum range R of the radar set will be considered as lying in a "far" region. Depending, then, on whether an echo signal is reflected by a target lying in the near region or in the far region, a switch 103 is set to a threshold value $S_{II}$ (higher than $S_I$) or $S_{III}$ (lower than $S_{II}$ but higher than $S_I$). For echoes which have exceeded these thresholds, an intelligence signal is added via the switch, namely, a bit which is added to the digitalized target signal, and is likewise applied to the filter 102. Signals thus characterized reach, via filter 102, a buffer storage unit 104. Of the remaining signals applied to filter 102, only those signals reach the storage unit 104 which fall within a given regex, the limits of which are fed into the filter 102, via another storage device 105 and, if desired, a further buffer storage unit 106, by a computer 107. The buffer storage unit 104 is constituted by the above-mentioned buffer which is located at the receiver, as is the filter 102. The assembly incorporating the filter 102 and the buffer 104 may be connected to the assembly incorporating the computer 107, the storage unit 105, as well as an output A which allows the signal output to be subjected to further data processing, by means of relatively long electrical conduit means, so that it is not essential for these assemblies to be in close physical proximity to each other. It is for just such an arrangement, i.e., an arrangement in which the two assemblies are located more or less far apart, that the additional buffer storage unit 106, which is located at the site of the receiver assembly, is useful because this buffer is able to apply the information to the filter 102 in an irregular pulse rate, as is sometimes required, while the buffer 106 itself is fed at a relatively regular rate, as a result of which the band width of the spectrum fed through the conduits which interconnect the two assemblies may be kept quite narrow.

The filter 102 uses, as a criterion of whether a given echo is likely to pertain to a previous one, the proximity relation between echo $P'$ and the sector midpoint $P_M$ (see FIGURE 1). If the echo $P'$ is close enough to $P_M$, it is considered as probably pertaining to the previous one.

$P' = (r', \phi')$ and $P_M = (r_M, \phi_M)$ are adjacent, i.e., near enough, if $r'$ and $r_M$ as well as $\phi'$ and $\phi_M$ are adjacent. The difference between two numbers is obtained by subtraction. This however, requires a time interval corresponding to the duration of several pulses, and is therefore not usable in a filter which has to produce the result within one pulse period of 1 microsecond. In place of subtraction, therefore, a comparison is made: two numbers are adjacent if their higher digits coincide, when one of the two numbers is given an addendum or dedendum $\pm\delta$ (corresponding to the position number) and the comparison is expanded to the varied value because otherwise adjacent values lying on one side or the other of a carry over would not be recognized.

For an integral number $$Z = \sum_{i=1}^{n} a_i b^{i-1} \qquad (1)$$

($b \geq 2$, integral=base; $0 \leq a_i \leq b$, integral=number; $n > 0$, integral=position number) there is obtained if $0 < k < n$, integral=the number of irrelevant digits and $\delta \leq b^k$, integral=addendum or dedendum of the adjacent region, $$\Delta = b^k + 2\delta - 1 = Z_{max} - Z_{min} \qquad (2)$$

with $$Z_{min} = \sum_{i=k+1}^{n} a_i b^{i-1} - \delta = \text{lower limit} \qquad (3)$$

and $$Z_{max} = \sum_{i=k+1}^{n} a_i b^{i-1} + b^k - \delta - 1 = \text{upper limit} \qquad (4)$$

*Example 1*

$Z = \underline{254}\ 38;\ k=2;\ \delta=75$
$\Delta = 100 + 150 - 1 = 249$
$Z_{min} = 25,400 - 75 = 25,325$
$Z_{max} = 25,400 + 100 + 75 - 1 = 25,574$
$Z_{min} + \delta = 25,325 + 75 = \underline{254}\ 00$
$Z_{max} - \delta = 25,574 - 75 = \underline{254}\ 99$

*Example 2*

$Z = LOLLO;\ k=2;\ \delta=LL$
$\Delta = LOO + LLO - L = LOOL$
$Z_{min} = LOLOO - LL = LOOOL$
$Z_{max} = LOLOO + LOO + LL - L = LLOLO$
$Z_{min} + \delta = LOOOL + LL = \underline{LOL}\ OO$
$Z_{max} - \delta = LLOLO - LL = \underline{LOL}\ LL$ All numbers which lie within the adjacent region $\Delta$ appear either as themselves, or increased by the addendum or decreased by the dedendum, with the same numbers in the higher-order digits as the comparison number Z. Inasmuch as the adjacent region $\Delta$ remains fixed so long as Z changes within the limits of the irrelevant digits, the distance of Z from the extreme adjacent regions $Z_{min}$ and $Z_{max}$, depending on the position of Z, is more or less irregular. The maximum irregularity becomes smallest, relatively for $\delta = b^k$ and absolutely for $b=2$.

The differential formation which is actually required is not eliminated, but appears as addition or subtraction, as the case may be, upon the formation of the variants $Z \pm \delta$. The effect which is obtained, however, resides in that the time consuming addition process need not take place at the moment at which the numbers are compared, but can be carried out in advance if one of the numbers to be compared is previously available. In the above-mentioned case, then, the values of $P_M$ which pertain to the target are varied ahead of time so as to be available, for immediate comparison, upon the arrival of the incoming $P'$.

The computer calculates the co-ordinates ($r_M$, $\phi_M$) of the ring sector midpoint $P_M$ for each target, and these values are stored. As is apparent from FIGURE 3, which is a plot similar to that of FIGURE 1 and additionally shows the location of the radar set at 0, $$r_M = \sqrt{r^2 + s^2 - 2rs \cos \sphericalangle OPP_M} \qquad (5)$$

$$\sphericalangle OPP_M = 90° + \psi + 90° - \phi = 180° - (\phi - \psi) \qquad (6)$$

Therefore, $$r_M = \sqrt{r^2 + s^2 + 2rs \cos (\phi - \psi)} \qquad (7)$$

$$\phi_M = \arctan \frac{r \sin \phi + s \sin \psi}{r \cos \phi + s \cos \psi} \qquad (8)$$

Figure 4:
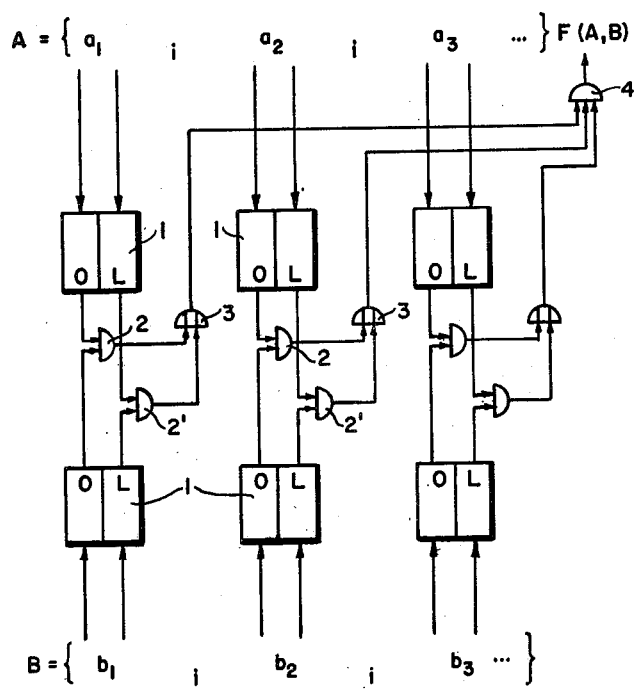
FIGURE 4 is a block diagram showing a component of a system according to the present invention.
Figure 5:
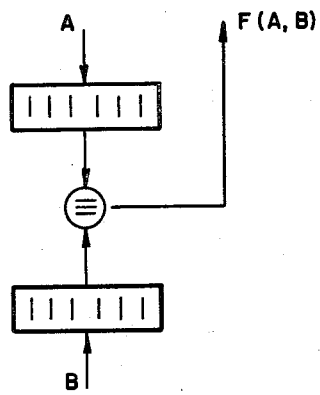
FIGURE 5 is a simplified symbolic representation of the component shown in FIGURE 4.

In order to compare two numbers insofar as their relevant digits are concerned, these numbers are received in two registers A and B, shown in the block diagram of FIGURE 4. These registers may, for example, be composed of flip-flops 1 each symbolized by two areas marked "O" and "L", respectively, to represent the two states of each flip-flop. Each digit of A is compared with the corresponding digit of B; this is done by connecting the corresponding outputs of the flip-flops each to an AND-gate 2, 2', and connecting the outputs of both AND-gates to an OR-gate 3. The latter thus produces an output voltage L only when both flip-flops occupy the same position. The outputs of the OR-gates 3 of all digits are connected to a further AND-gate 4 which thus has an output voltage L only when all of the digits in the registers A and B coincide with each other. The coincidence circuit as a whole may be represented symbolically as shown in FIGURE 5.

In order to relate the echos arriving during an antenna revolution to the echos which have arrived during the previous revolution, the following values will be calculated: (a) the midpoint of the regex of the echos from such previous revolution, (b) the value obtained by adding the addendum $\delta$, and (c) the value obtained by subtracting the dedendum $\delta$. Each such set of three values then makes it possible to determine whether an echo arriving during the subsequent antenna revolution is near the center of the regex. This comparison will be answered affirmatively if the relevant digits of the target co-ordinates coincide with the corresponding digits of one of the three values.

Figure 6:
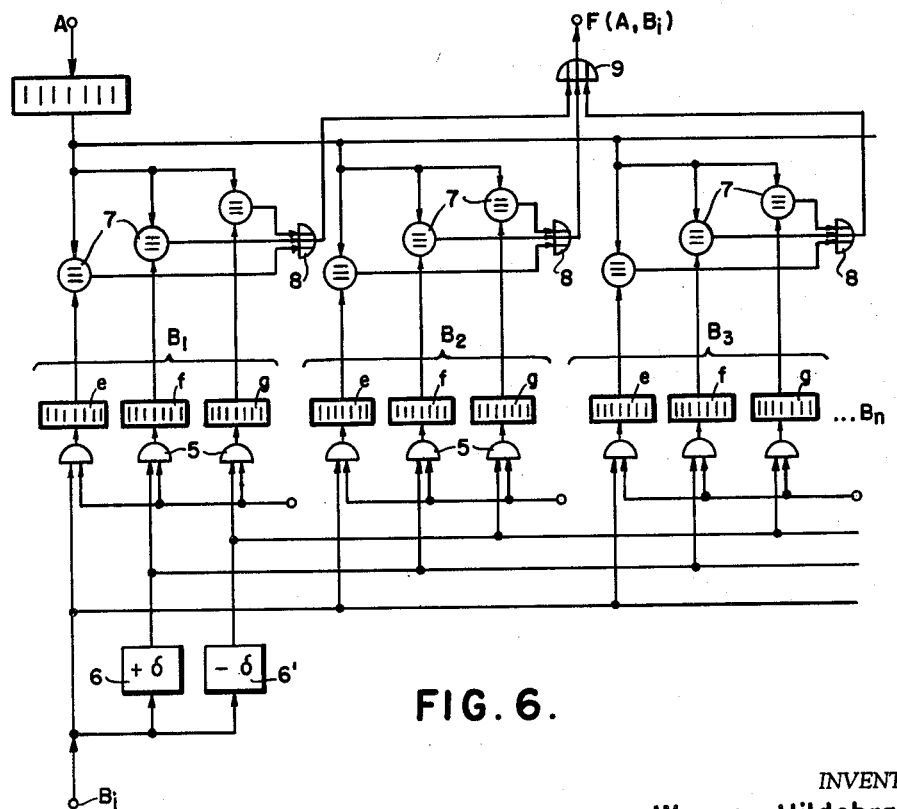
FIGURE 6 is a block diagram showing a part of a system according to the present invention which includes the component of FIGURES 4 and 5.
Figure 7:
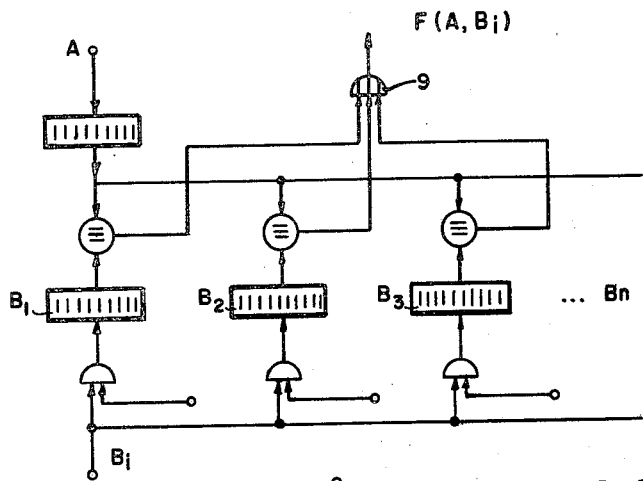
FIGURE 7 is a simplified symbolic representation of the part shown in FIGURE 6.

In order to determine the coincidence of newly arriving target co-ordinates A with a plurality of pre-calculated expectation values $B_n$, a comparison network such as is shown in FIGURE 6 may be used. This circuit comprises registers $B_1$, $B_2$, $B_3$ ... $B_n$ each of which is composed of three register portions. By using AND-gates 5 which open the register inputs, the midpoint values $B_i$ are distributed to the registers B and pass from there to the lefthand register portion $e$ of each respective register. The other input of each AND-gate 5 is controlled in a manner similar to that in which the gates 42 (to be described below in conjunction with FIGURES 10 and 10a) are controlled. At the same time, the circuits 6 and 6', by adding and subtracting, respectively, the value $\delta$, feed the other two values of each three-value set, namely, the values $B_i + \delta$ and $B_i - \delta$, into the middle and right-hand register portions $f$, $g$, respectively, of each register B. The new value which is to be compared is fed to the register A. If this value coincides with one of the values of the three-value set, the corresponding comparison circuit 7 applies a signal to corresponding OR-gate 8 which, in turn, applies a signal to the OR-gate 9 whose inputs are connected to the outputs of all of the OR-gates 8. It should be noted that the variant $\pm\delta$ cannot be applied to the echo values A because the same may follow at microsecond speed, and it is for this reason that the variant is applied to the values $B_i$ which are available for a sufficiently long period of time. The network of FIGURE 6 as a whole can be represented symbolically as shown in FIGURE 7.

For the sake of clarity, the term "echo" will hereinafter be used to refer to new target co-ordinates which are obtained during an antenna revolution, the term "target values" to denote the values calculated on the basis of the information obtained during the previous antenna revolution, namely, the three-value set made up of the regex midpoint, the regex midpoint plus the addendum, and regex midpoint less the dedendum. The echos from all targets arrive one after the other. For comparison purposes, the filter must therefore have those target values ready which pertain to the expected echo. If only one or two sets of target values are ready, they must be exchanged very rapidly if, in the same direction, there are a plurality of targets following each other very closely. At 150 m., the change-over must occur at microsecond pulse rate. Inasmuch as for any one set of target values the echo may appear within a bearing range containing many discrete bearing values, the sets of target values must be made available a corresponding number of times, in case additional sets of target values require the exchange to be made.

Figure 9:
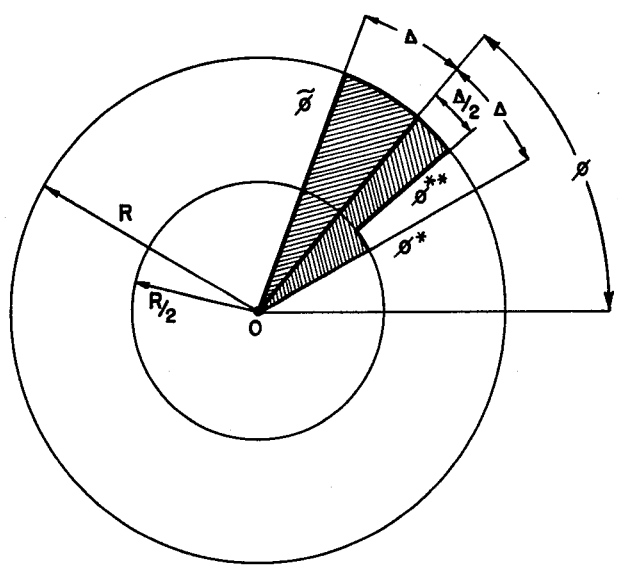
FIGURE 9 is yet another geometric representation, showing other explanatory material.

In order to avoid these difficulties, all sets of target values are made available which fall within the bearing range $2\Delta\phi$ (see FIGURE 9). In the single case $2\Delta\phi$ is the angle, as seen from the radar set site 0, subtended by a given ring sector, the size of $2\Delta\phi$ varying between about ½° and several degrees. In the simplest case the same $\Delta\phi$ value will apply for all targets, $\phi$ being the actual direction from which the echos arrive.

$$\tilde{\phi} = \phi + \Delta\phi$$

forms the upper limit. As soon as the angle $\phi_M$ of a target is less than the upper limit, the set of target values must be available for comparison purposes.

$$\phi^* = \phi - \Delta\phi$$

forms the lower limit. As soon as $\phi_M$ is less than the value $\phi^*$, the period during which the particular set of target values has to be available for comparison purposes (hereinafter referred to as the period of availability) is at an end, and the set is exchanged for a new one. These instants of time are continually monitored by means of an adder which forms the differences $$\phi_M - \tilde{\phi} \text{ and } \phi_M - \phi^*$$

The embodiment of the filter which will be described below operates with a single $\Delta\phi$ value, as just explained.

Figure 8:
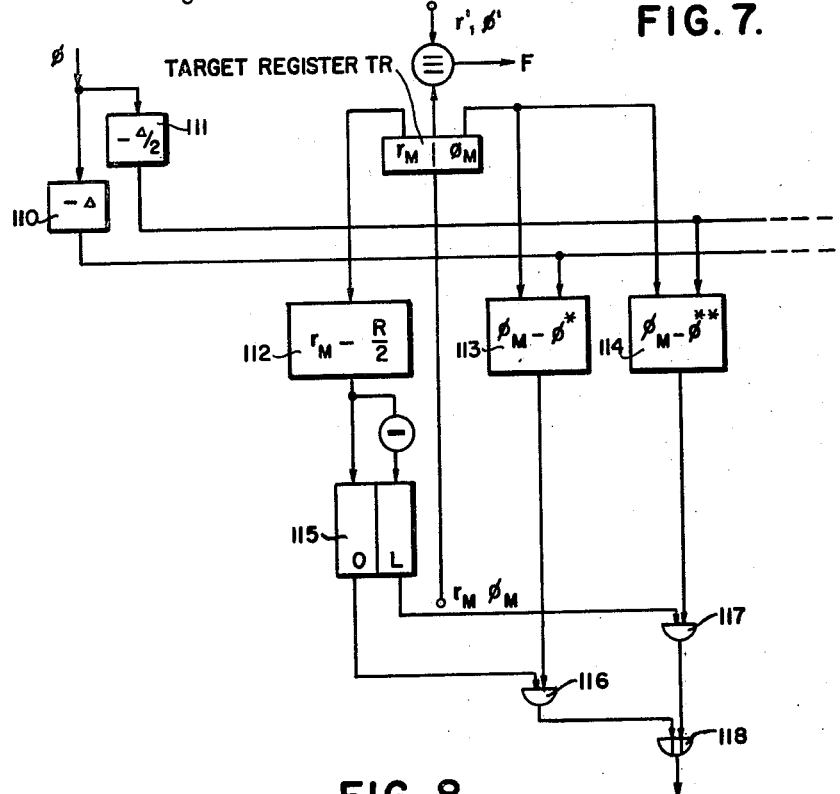
FIGURE 8 is a block diagram of another component of a system according to the instant invention.

FIGURE 8 shows an arrangement which differs from the above in that the lower limit of the period of availability is two-staged and is a function of distance.

In addition to the lower limit $\phi^* = \phi - \Delta$, a second lower limit $\phi^{**} = \phi - \frac{1}{2}\Delta$ is formed, and the angle $\phi_M$ of the target is continually compared to both limits. Also, the distance $r_M$ is compared to the limit $R/2$. If the distance is closer than $R/2$, then the period of availability ends at the limit $\phi^*$; if $r_M$ is further than $R/2$, then the period of availability ends already at $\phi^{**}$.

On the basis of the progressing antenna bearing angle the circuit 110 continuously forms the value $\phi^* = \phi - \Delta$ and the circuit 111 continuously forms the value $$\phi^{**} = \phi - \frac{1}{2}\Delta$$

A target register TR contains the target co-ordinates $(r_M, \phi_M)$. The comparison or subtracting circuits 112, 113, 114, form the values $r_M$, $R/2$, $\phi_M - \phi^*$, $\phi_M - \phi^{**}$, respectively, and produce an output signal "L" if their contents is less than zero; otherwise the output signal is "0." Consequently, a flip-flop 115 is caused to change its state when an echo stems from the near region, and the AND-gate 116 emits a signal when $\phi^*$ becomes larger than $\phi_M$. In the far region, the AND-gate 117 emits a signal when $\phi^{**}$ becomes larger than $\phi_M$. These signals are passed on via an OR-gate 118. The echo co-ordinates are $(r', \phi')$.

FIGURE 9 is a geometric representation of the above.

If desired, a similar stepping arrangement can be provided for the upper limit $\tilde{\phi}$.

The number of target registers $(n)$ must be made so large that all sets of target values lying between the limits can be made available. In practice, an average value must be selected because there is no absolute maximum. Transient bunching may therefore occur so that more than $n$ sets of target values have to be made available than can be monitored by means of the upper limit $\tilde{\phi}$. For this purpose, an additional target register $TR_{n+1}$ is provided which receives the direction $\phi_{Mn+1}$ of each subsequent target. An adder continually compares $\phi_{Mn+1}$ with $\tilde{\phi}$.

If, then, $\phi_{Mn+1}$ exceeds the limit $\tilde{\phi}$, from that instant on all incoming echos are additionally stored in a pre-buffer. As soon as the set of values can be made available, i.e., $P_{Mn+1} \rightarrow P_{Mn}$, the filter is fed by the pre-buffer, with the echos now being applied at maximum speed (at microsecond rate) until the filter can again be connected to the continuously arriving echo signals. If it is not possible to make several sets of target values available, this backward jump is repeated, as required. There is no danger of overfilling the pre-buffer because the same is continuously emptied at a far higher rate than it is filled.

FIGURES 10 and 10a are partial figures which form a schematic diagram showing a complete embodiment of a system according to the present invention. All information is transported in parallel. The echo information consists of the co-ordinate pair $(r, \phi)'$. The number $r$ runs to 1000 (1024) and is 10 bits long; $\phi$ runs to 10,000 and is 14 bits long. With a test bit there is obtained for $(r, \phi)$ the length of 25 bits. Clock pulse I applied to input 20 and clock pulse II applied to input 21 are two clock pulses each having a period of 1 microsecond, the clock pulses being shifted relative to each other by ½ microsecond. The echo pulse at input 19 is synchronized with clock pulse I and appears whenever an echo from the digital detector is received by the filter. The $r$-pulse at input 22 defines the distance and is identical with clock pulse I. The $\phi$-pulse at input 23, having a period of 1 millisecond, defines the bearing angle and therefore the start $r_0$ of the distance counter.

Each echo which arrives via lead $S_I$ (corresponding to threshold I; see FIGURE 2) simultaneously affects leads $S_{II}$ and $S_{III}$ if the higher thresholds II or III, as the case may be, are exceeded. If the echos stem from the near zone $(r \leq r_g)$, the lead $S_{II}$ connected via AND-gate 24 to a pre-buffer storage device $PB_{II, III}$ is activated by an OR-gate 25 and the lead $S_{III}$ is blocked by AND-gate 26; the converse will hold true when the echos stem from the adjacent region $(r > r_g)$. The switch-over is controlled by a counter $C_r$ which when the limit radius $r_g$ is reached sets the flip-flop $FF_1$, and by the $\phi$-pulse which clears the flip-flop. The counter returns to its zero position by itself, because it can count exactly from zero to $r_{max} = R$.

Inasmuch as $S_I$ is the lowest threshold value, each echo which arrives via $S_{II}$ or $S_{III}$ also arrives via $S_I$ into a pre-buffer storage device $PB_I$. It is therefore sufficient to store in the pre-buffer storage unit $PB_{II, III}$ but one bit ("Q") per echo, which bit indicates whether the particular echo has also exceeded the threshold value $S_{II}$ or $S_{III}$, as the case may be $(Q=L)$, or not $(Q=O)$. A following echo register $ER_{II, III}$ likewise consists only of a two-position stage for receiving the bits Q. When the echo co-ordinates $(r', \phi')$ are taken from an echo register $ER_I$ and transferred into a buffer storage device B, each echo has a bit "C" added to it which contains intelligence indicative of whether or not it is probable that the echo pertains to a target (if the echo probably pertains, $C=L$; if the echo does not pertain, $C=O$). The manner in which the bit C is added will be explained below.

The pre-buffer storage devices $PB_I$ and $PB_{II, III}$ each have separate inputs and outputs. The counters $C_{in}$ and $C_{out}$ control the input and output addresses of both storage devices. Each echo clock pulse advances counter $C_{in}$ by one; each such clock pulse also advances counter $C_{out}$ by one via AND-gate 28 insofar as the input and output addresses coincide with each other, a comparison gate 27 being provided for this purpose. The addresses are thus continuously and cyclically run through. The input addresses for the buffer storage device B are controlled by a counter C. This counter is conditionally advanced by a take-over pulse II, it being possible, instead, to use the clock pulse II. The condition is fulfilled whenever the buffer storage device has taken over an echo. The condition consists of the take-over pulse, which stems from the take-over pulse II that sets the flip-flop $FF_2$. As soon as a pulse appears which advanced this counter, the flip-flop $FF_2$ is again cleared. The output addresses of storage device B are controlled by the control unit of the computer.

The echo pulse applied at input 19, acting as take-over pulse I, causes the echoes to be transferred from the echo register $ER_I$ to the storage device B. Each such clock pulse further sets a flip-flop $FF_3$ whose output, which has now been activated, is connected to an AND-gate 30, so that half a pulse later the clock pulse II causes the transfer of each penultimate echo from $PB_I$ to $ER_I$ as well as the transfer of the corresponding bit Q from $PB_{II, III}$ to $ER_{II, III}$ via AND-gates 31 and 32. For this purpose, the output addresses of the same storage cell of the pre-buffer storage devices are greater by one than the input addresses.

The echo $ER_I$ is compared simultaneously with the various sets of target values, i.e., the midpoints $P_M$ of the regexes as explained above, which have been made available in target registers $TR_1, TR_2, TR_3, \ldots TR_n$. The echo appears in $ER_I$ at the time of pulse II. The result of the comparison is then available, at the subsequent pulse I, at the output of the network, namely, the OR-gate 9. If the echo is in the vicinity of the target value that has been made available, the result is "L." What is involved here is an echo which probably pertains to a target. The L-pulse of OR-gate 9 is applied to AND-gate 33 and causes the bit $C=L$ to be added to the echo value. The L-pulse is also applied, via OR-gate 34, to the AND-gate 35, so that the take-over pulse I can bring about, via AND-gate 36, the transfer into buffer B. The take-over pulse II advances the address Z of buffer B by one, and also transfers the next echo from $PB_I$ into $ER_I$ and corresponding bit Q from $PB_{II, III}$ into $ER_{II, III}$. In the case of a non-correlatable echo (no L-pulse from OR-gate 9), the above steps will nevertheless occur if $ER_{II, III}$ contains the value $Q=L$, this L-potential being applied via AND-gate 37, whose further conditions $\overline{rs}$ will be discussed below, to gates 34 and 35. However, the AND-gate 33 has applied to it the 0-potential from OR-gate 9, so that the echo is transferred from echo register $ER_I$ to buffer B with bit $C=O$. If, however, $Q=O$ in the case of a non-correlatable echo, the echo does not reach buffer B, and the address Z is not changed, while the next echo is brought into the echo register, as described above.

Each target register $TR_i$ has associated with it an adder $D_i$ which by using the value $\phi_M$ obtained from the associated register as well as the $\phi$-value which has been reduced, in circuit 10, by an amount $\Delta$ and is applied via gates 38 and 39, continuously forms the difference $\phi_M - \phi^*$, as explained above, with the clock pulse I delivering the adder pulse via an AND-gate 40 whose further conditions will be explained below. If the period of availability of a target value has run out, the output of the associate adder $D_i$ delivers a pulse which sets an associated target value follower flip-flop $TF_i$ and stops the adder via an associated AND-gate 41. This annunciates the demand to exchange the target value. The new target value arrives as a pre-calculated value from the storage unit S of the electronic computer via an associated AND-gate 42, assuming certain conditions are met.

The angles $\phi_{Mn+1}$ of the target values to be made subsequently available are stored in a target register $TR_{n+1}$. An associated adder $D_{n+1}$ uses this value as well as the $\phi$-value which has been increased by $\Delta$ in circuit 10' in order continuously to form the difference between $\phi_{Mn+1}$ and the upper limit $\widetilde{\phi}$. The adder pulse applies the clock pulse I via the additionally conditioned AND-gate 43. The adders $D_1, D_2, D_3 \ldots D_n, D_{n+1}$, can be replaced by a single adder which is connected cyclically so as to service all digits.

It is possible that the periods of availability of a number of target values end simultaneously or shortly after each other. The information transfer of the $TF_i$ flip-flops is therefore controlled subject to rank, with each flip-flop $TF_i$ having a higher rank than all such flip-flops to its right and a lower rank than all such flip-flops to its left. If, after an exchange process has already started, a digit of higher rank annunciates its readiness, the new target values drift into the higher-rank target register and the subordinate digit repeats its exchange. This is brought about by the AND-gates 44 through which the set flip-flops $TF_i$ annunciate themselves. The transfer ability of each AND-gate, as shown in the drawing, is conditioned on the fact that another flip-flop to its left has not been set. The leftward-most flip-flop $TF_1$ does therefore not require any gate 44.

An exchange annunciation of a flip-flop TF reaches, via an OR-gate 50, the program control 45 of the computer. As soon as the storage device S is accessible, the program control sets a make-ready flip-flop $FF_4$. The clock pulse II then becomes effective via AND-gate 46 and moves an "L" through a shifting chain SC (exchange control) which controls the make-available process, the latter taking up 5 pulses.

At the *first* pulse, the first element $sc1$ of the chain, which is set at L, delivers a pulse via OR-gate 47 to AND-gate 48. As a result, the clock pulse I causes the transfer of the next target address from a counter $C_t$ into the control register CR of the control device of the computer.

At the *second* pulse, the second element $sc2$ sends a pulse to AND-gate 49. The target value is thereby transferred from storage unit S to the leftward-most target register $TR_i$ whose associated flip-flop $TF_i$ has been set, this transfer taking place via the appropriate gate 42. Furthermore, the counter $C_t$ is caused, via AND-gate 51, to be advanced by one as a result of clock pulse I. In addition, the L-potential is taken away by an AND-gate 52 during the switching of the second element $sc2$, so that the output of gate 52 becomes 0, as a result of which the AND-gate 40 can no longer apply the clock pulse I to the adders $D_i$ so that during this time no other flip-flop $TF_i$ can be set.

At the *third* pulse, the third element $sc3$ applies an L-potential to the gates 47 and 48 and brings about the transfer of the next target value address from counter $C_t$ to the control register CR. Also, the clock pulse I, acting via AND-gate 53 and a corresponding OR-gate 54, clears the flip-flop $TF_i$. The adder pulse remains suppressed via gate 52. If a flip-flop $TF_i$ further to the right was previously set, the L-potential thereof is now passed through, because upon clearing of the more leftwardly located flip-flop the gate 44 becomes conductive and reaches, via gate 50, the program control 45.

At the *fourth* pulse, the fourth element $sc4$ applies the L-potential to an AND-gate 55, whereby clock pulse I can transfer the next target values from storage device S to the target register $TR_{n+1}$. Inasmuch as $sc2$ and $sc3$ are again in their original state, the adder pulse can pass via gates 52 and 40, because from now on a new annunciation may occur.

At the *fifth* pulse, $sc0$ clears the make-available flip-flop via AND-gate 56, if no further annunciating potential has been applied to program control 45 via gate 50. In that case, a negative potential is applied, via negator 57, to an input of AND-gate 56, whereupon there would be no clearing pulse for the flip-flop $FF_4$. As a result, a make-available cycle would immediately follow.

If the period of availability for the next target value starts without such target value, however, being available, the adder $D_{n+1}$ delivers a pulse which, via an AND-gate 58, transfers the instantaneous output address of the two pre-buffer storage devices $PB_I$ and $PB_{II, III}$ from counter $C_{out}$ to a return register RR, which pulse also sets a return flip-flop $FF_5$. Inasmuch as $\overline{rs}=0$, the adder $D_{n+1}$ will be at rest because the gate 43 is non-conductive. As soon as this next target value is made available, the make-available pulse 3 from the shifting chain SC, which passes through gate 53 and through AND-gate 59, transfers, as it passes through AND-gate 60, the position of counter RR back to counter $C_{out}$ and simultaneously clears flip-flop $FF_5$. Flip-flop $FF_5$ prevents the contents of the return register RR from being transferred to counter $C_{out}$ upon each target value exchange. The addresses of counters $C_{in}$ and $C_{out}$ now no longer coincide, so that gate 28 is closed; on the other hand, the AND-gate 62 is conductive because of the L-potential emitted by negator 61, as a result of which counter $C_{out}$ is now controlled, via OR-gate 63, by clock pulse I. Furthermore, upon non-identity ($\overline{id}$) the gate 38 is closed and in place thereof an AND-gate 64 is opened. The limits $\phi^*$ and $\widetilde{\phi}$ are now formed, via OR-gate 39, with the $\phi$-values appearing in echo register $ER_I$. Inasmuch as beginning with make-available pulse 3 the condition $\overline{rs}$ is again fulfilled ($=L$), adder $D_{n+1}$ is again operative as soon as the shifting chain SC is brought back to its 0-position with pulse 5. (Adder $D_{n+1}$ is at rest during the making ready of a target value because $sc0=0$.) Counter $C_{out}$ is controlled by clock pulse I until coincidence with counter $C_{in}$ is again attained.

The echo register $ER_{II, III}$ causes the gate 37 to open only when $\overline{rs}=L$. This has to be so because upon re-setting, the echos involved will repeatedly run through the echo registers, although the transfer of non-correlatable echos to buffer B should be possible only once.

A possible stationary target suppression is shown in dot-dash lines. Each known stationary target is stored in storage unit S with as many points $P_M$ as are necessary just to cover the target. A stationary target bit K which is to be added has the value L. For all other targets $K=O$. This K-bit appears along with the other information in the target registers $TR_i$. If now the echo of a stationary target reaches the storage register $ER_I$, the echo transfer into storage device S is prevented if, while there is a K-bit, an identity gate is activated which, via an associated AND-gate 65 as well as a collective OR-gate 66, produces an L-potential which, via negator 67, renders the gate 33 nonconductive. It is true that in this case the echo of a moving target which is superimposed on the echo of the stationary target will not be recognized, and a stationary target point will, in the illustrated filter system, suppress all echos from an area having a diameter of 1.5 to 3 kilometers.

The above-described system carries out a pre-testing and a corresponding selection of echos. The final determination of whether an echo is correlatable to a previous one can then be accomplished in the appropriately programmed electronic computer. The program works with the buffer storage device B which receives all of the echos passed through by the filter, whereby, for purposes of distinguishing echos, the bit "C" was added whose value is determined by the filter. An echo will be correlated to all possible targets to which it is correlatable. (Or: one target will have correlated to it all echos which can be correlated to it.)

It will always be those targets that enter into consideration which, using the echo direction $\phi'$ as a base, fall within a given angular range. An echo which is probably correlatable ($C=L$) is at first correlated only to known targets. Only if it cannot be correlated with a known target is an attempt made to correlate it, as a second echo, to a first echo. An echo which cannot be correlated ($C=O$) is correlated, as a second echo, to first echos exclusively, insofar as this is possible. Each echo which cannot be correlated is taken up in the storage device as a first echo. Spurious echos which have passed this preliminary examination will be recognized as spurious echos only when the expected further echos are not forthcoming. As soon as a first echo can have a second echo correlated to it, it is provided with a characterizing indicia, for example, a flight number.

If a target below the lower limit of the angular range is hit, to which target no echo can be correlated, this means that the echo pertaining to such target is missing. The target involved is then automatically moved ahead, and the subsequent regex is enlarged. A first echo is eliminated as soon as of the subsequent echos two consecutive ones are found to be missing. A known target is eliminated as soon as four consecutive echos have been found to be missing.

The echo-target relation, in the course of the final correlation, is formed as follows:

The radius vector $(r, \phi)$ and the speed vector $(s, \psi)$ corresponding to 10 seconds (representing a secant of the line of flight or trajectory) of a known target are stored for the last point $P_1=P$. When an echo $P'=(r', \phi')$ is received which probably pertain to target P, P' and P are brought into relation with each other. Referring to FIGURE 11, which is a geometric plot similar to that of FIGURE 3, $$s'=\sqrt{r^2+r'^2-2rr'\cos(\phi-\phi')}=F_1(r, \phi; r', \phi') \quad (9)$$

$$\Psi'=\arc\tan\frac{r'\sin\phi'-r\sin\phi}{r'\cos\phi'-r\cos\phi}=F_2(r, \phi; r', \phi') \quad (10)$$

If then the two conditions $$0.9 \leq \frac{s'}{s} \leq 1.1 \quad (11)$$

$$|\Psi-\Psi'| \leq 30° \quad (12)$$

are fulfilled, the echo lies in the ring sector; if these conditions are not fulfilled, the echo does not lie in the sector.

An echo which cannot be correlated is considered as a new echo, i.e., as the first echo of a newly appearing target if, by reason of its strength it must be regarded as a true echo, or if it originates from a likely source, such as a border zone, an airport, or the like. The regex for the second echo is then a complete annular area in whose center the first echo lies, the inner and outer diameters of this area being determined by minimum and maximum air craft speeds.

As previously stated, the exact regex can be determined for the signal selection. For this purpose all of the $10^7$ cells of the total area can be numbered consecutively. The total number of all ring sectors are sequentially arranged in the storage device. Each incoming echo carries the number of the cells from which it originates. Inasmuch as the cells are scanned in their numerical sequence, all echoes will also arrive in order, i.e., in numerical sequence. The correlated process will then consist of merely a synchronous comparison between the "echo numbers" and the "target numbers." As soon as identity is established, it can be concluded that the respective echo and target pertain to each other. In this case it is possible, for example, to apply all previously calculated target numbers back to the filter, which itself can then carry out the final correlating process.

It will be understood that the above description of the present invention is susceptible to various modifications, changes, and adaptations, and the same are intended to be comprehended within the meaning and range of equivalents of the appended claims.

What is claimed is:

1. In an evaluating system for processing radar signals, the combination which comprises: means for receiving the radar signals; and means for selecting from signals following a first signal those signals which bear a precalculated correlation to said first signal, said correlation being a function of target co-ordinate change, said selecting means determining, on the basis of previously determined target positions, a region of expectation from which subsequent signals are expected to originate, said selecting means including filter means which are responsive to a criterion based on the determination made by said selecting means, said filter means being additionally responsive to subsequent signals which do not fulfill said criterion and are therefore not correlatable to a previously determined target position but exceed a predetermined threshold value.

2. The combination defined in claim 1 wherein said threshold value is a function of the distance of the target from said receiving means.

3. In an evaluating system for processing radar signals, the combination which comprises: means for receiving the radar signals; and means for selecting from signals following a first signal those signals which bear a precalculated correlation to said first signal, said correlation being a function of target co-ordinate change with the target positions being in digital form, said selecting means determining, on the basis of previously determined target positions, a region of expectation from which subsequent signals are expected to originate, said selecting means including an electronic computer for calculating the expected target positions by calculating a representation of said region of expectation, and filter means which are responsive to said representation calculated by said electronic computer.

4. The combination defined in claim 3 wherein said computer is programmed for calculating arcuate as well as annular areas.

5. The combination defined in claim 4 wherein said areas are concentric with respect to a previously determined target point and have a radial dimension which is a function of the speed of the target.

6. The combination defined in claim 5 wherein, in the case of an arcuate area constituting a portion of an annular area, the center of such arcuate area and the angle which such area subtends are determined on the basis of two previously determined target points and on the basis of the ability of the target to change its direction of travel.

7. In an evaluating system for processing radar signals, the combination which comprises: means for receiving the radar signals; and means for selecting from signals following a first signal those signals which bear a pre-calculated correlation to said first signal, said correlation being a function of target co-ordinate change with the target positions being in digital form, said selecting means determining, on the basis of previously determined target positions, a region of expectation from which subsequent signals are expected to originate, said selecting means including an electronic computer for calculating the expected target positions by calculating the co-ordinates of at least one point in said region of expectation, and filter means which are responsive to a vicinity criterion based on the calculation of said computer.

8. The combination defined in claim 7 wherein said filter means comprise register means for receiving the co-ordinates of observed and calculated targets, and comparison circuit means responsive to said register means for controlling said filter means to cause the latter to pass radar signals when the co-ordinates of observed targets represented thereby are in the vicinity of co-ordinates of calculated targets.

9. The combination defined in claim 8 wherein said register means additionally receive adjacent co-ordinate values formed by adding an addendum to and subtracting a dedendum from the principal co-ordinate value, and wherein said comparison circuit means compare the co-ordinates of observed targets with said principal and adjacent co-ordinate values.

10. The combination defined in claim 8 wherein said filter means comprise additional register means cooperating with the first-mentioned register means, said additional register means being responsive to threshold values for additionally controlling said filter means.

11. The combination defined in claim 10 wherein said additional register means is a one-bit register.

12. The combination defined in claim 8 wherein said filter means further comprise means controlled by said comparison circuit means for adding a distinguishing characteristic to the radar signals when the same are correlatable to an observed target.

13. The combination defined in claim 8 wherein said filter means comprise means for applying to said register means signals reflected by targets located within a predetermined bearing range sector covered by the antenna radiation pattern.

14. The combination defined in claim 13 wherein said sector is composed of partial sectors whose angles are stepped as a function of distance.

15. The combination refined in claim 14, further comprising means for moving the antenna radiation pattern, and means for synchronizing the application of radar signals received in each sector to said register means with said moving means.

16. The combination defined in claim 15 wherein, when the receiving ability of said register means is exceeded due to a bunching of incoming radar signals, the synchronism is temporarily interrupted and thereafter restored, during which interruption such bunched signals are applied to a buffer device from which such signals are then taken.

17. The combination defined in claim 15 wherein, for controlling the transfer of pre-calculated target positions into said register means, substantially continuously operating adder means are provided for comparing values contained in said register means with bearing angle limit values obtained from the antenna bearing angle.

18. The combination defined in claim 17, further comprising an output address counter, an auxiliary register, and an additional adder means effective in the event of transient bunching of pre-buffer storage output addresses from said output address counter for applying such output addresses to said auxiliary register.

19. The combination defined in claim 17 further comprising a series of storage switch means for emitting an annunciating signal, and an AND-gate for sequentially activating said switch means; said adder means being connected to apply their comparison criteria to said series of storage switch means.

20. The combination defined in claim 17 further comprising a plurality of target co-ordinate registers; said adder means comprising a single adder through which addendum and dedendum values for said plurality of target co-ordinate registers are passed consecutively.

21. In an evaluating system for processing radar signals, the combination which comprises: means for receiving the radar signals; and means for selecting from signals following a first signal those signals which bear a pre-calculated correlation to said first signal, said correlation being a function of target co-ordinate change, said selecting means determining, on the basis of previously determined target positions, a region of expectation from which subsequent signals are expected to originate, said selecting means including filter means which are responsive to a criterion based on the determination made by said selecting means, said selecting means including means for suppressing, during a later selection, signals if further expected signals correlatable to such signals are missing.

22. In an evaluating system for processing radar signals, the combination which comprises: means for receiving the radar signals; and means for selecting from signals following a first signal those signals which bear a pre-calculated correlation to said first signal, said correlation being a function of target co-ordinate change with the target positions being in digital form, said selecting means determining, on the basis of previously determined target positions, a region of expectation from which subsequent signals are expected to originate, said selecting means including a digital detector connected to the output of said receiving means, filter means connected to the output of said detector, said filter means being responsive to a criterion based on the determination made by said selecting means, a buffer storage unit connected to the output of said filter means, and an electronic computer connected to the output of said buffer storage unit for calculating the expected target positions.

23. In an evaluating system for processing radar signals, the combination which comprises; means for receiving the radar signals; and means for selecting from signals following a first signal those signals which bear a pre-calculated correlation to said first signal, said correlation being a function of target co-ordinate change with the target positions being in digital form, said selecting means determining, on the basis of previously determined target position, a region of expectation from which subsequent signals are expected to originate, said selecting means including filter means responsive to a criterion based on the determination made by said selecting means, a first buffer storage unit connected to the output of said filter means for receiving the information passed through by the latter, a computer connected to the output of said first buffer storage unit for receiving the information stored therein, said computer utilizing such information for calculating the expected target positions, and a second buffer storage unit connected to the output of said computer for receiving the calculations made by the latter, the output of said second buffer storage unit being applied to said filter means.

References Cited in the file of this patent

UNITED STATES PATENTS

| | | |
|---|---|---|
| 2,709,804 | Chance et al. | May 31, 1955 |
| 2,849,707 | White | Aug. 26, 1958 |
| 2,943,316 | Coverly | June 28, 1960 |
| 2,944,253 | Coverly et al. | July 5, 1960 |
| 3,018,959 | Thomas | Jan. 30, 1962 |
| 3,060,422 | Kell | Oct. 23, 1962 |